United States Patent [19]

Jackson

[11] Patent Number: 5,036,614
[45] Date of Patent: Aug. 6, 1991

[54] ANIMATED BIRD DECOY

[76] Inventor: Larry L. Jackson, Rte. 3, Sterling, Colo. 80751

[21] Appl. No.: 471,942

[22] Filed: Jan. 29, 1990

Related U.S. Application Data

[63] Continuation-in-part of Ser. No. 288,034, Dec. 20, 1988, Pat. No. 4,896,448.

[51] Int. Cl.⁵ ............................................. A01M 31/06
[52] U.S. Cl. .................................................... 43/3
[58] Field of Search .......................................... 43/3, 2

[56] References Cited

U.S. PATENT DOCUMENTS

| | | | |
|---|---|---|---|
| 547,553 | 10/1895 | Keller . | |
| 2,663,108 | 12/1953 | Dixon et al. | 43/3 |
| 2,691,233 | 10/1954 | Richardson | 43/3 |
| 2,747,316 | 5/1956 | Benedetto . | |
| 2,752,715 | 7/1956 | Miller | 43/3 |
| 2,849,823 | 9/1958 | Miller | 43/3 |
| 3,435,550 | 4/1969 | Carlson . | |
| 3,916,553 | 11/1975 | Lynch | 43/3 |
| 4,128,958 | 12/1978 | Snow . | |
| 4,896,448 | 1/1990 | Jackson | 43/3 |

Primary Examiner—Kurt Rowan
Assistant Examiner—James Miner
Attorney, Agent, or Firm—Gregg I. Anderson

[57] ABSTRACT

An animated bird decoy including a body and a pivoting mechanism mounted therein is disclosed. The pivoting mechanism pivots the body relative to a support assembly inserted into the earth. The pivoting mechanism includes a battery-operated motor, which creates a rotary motion, which rotary motion is transformed into reciprocal motion and which is in turn transformed into pivotal or oscillatory motion of the body in a vertical plane about a pivot axis of the support assembly. The support assembly is pivotal in a horizontal plane to selectively present a high profile to game birds. A method of the invention shows how a bird decoy body can be modified to include the pivoting mechanism.

6 Claims, 3 Drawing Sheets

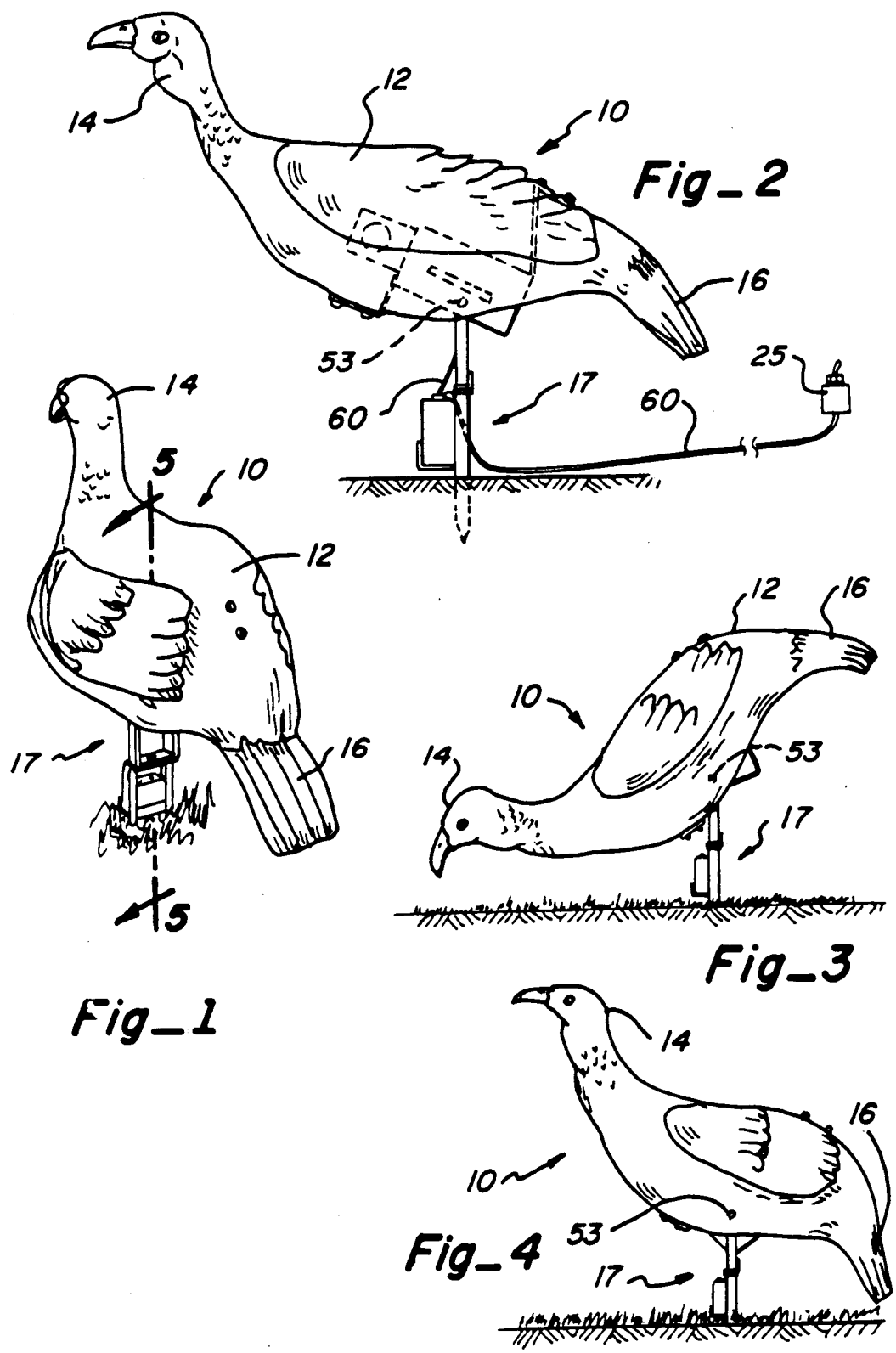

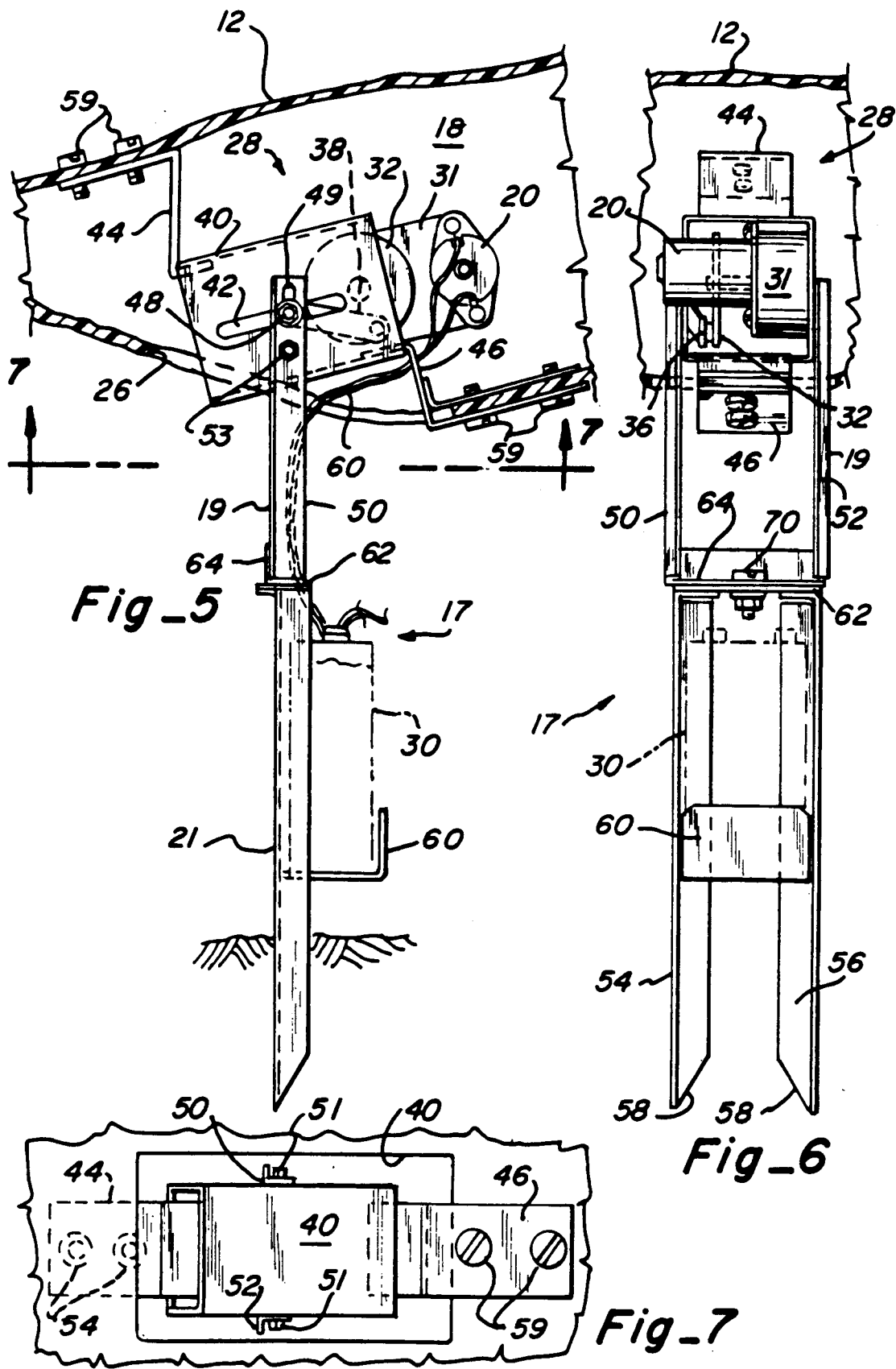

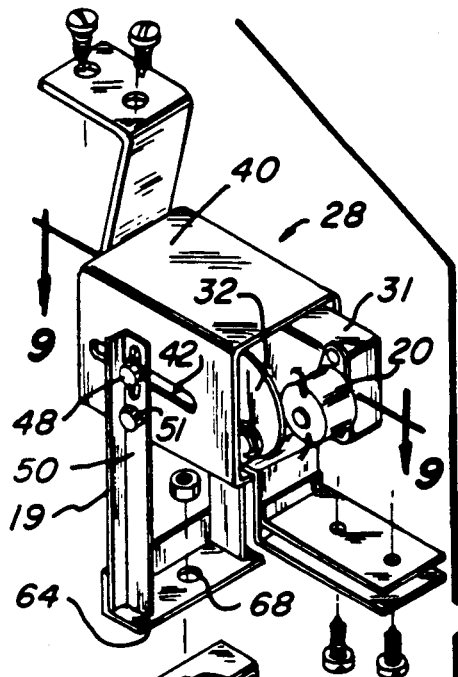
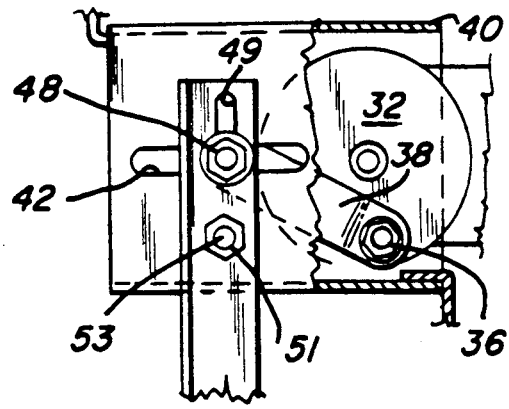
Fig_10
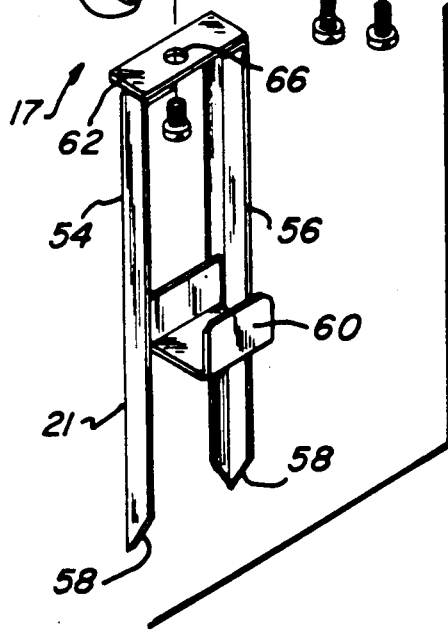
Fig_8
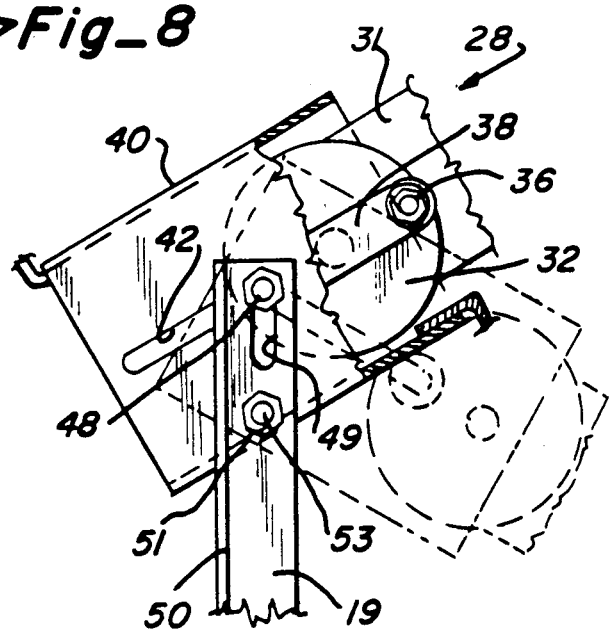
Fig_11
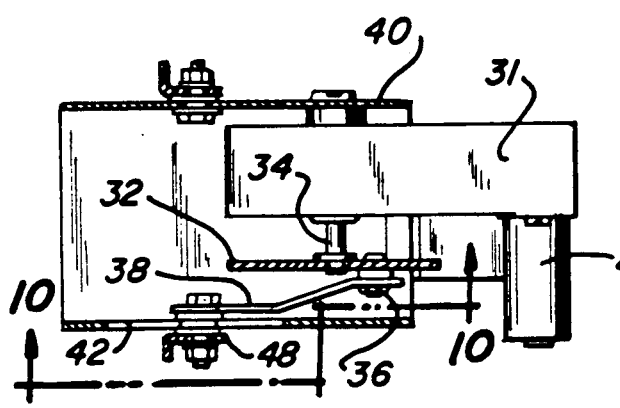
Fig_9

ANIMATED BIRD DECOY

CROSS REFERENCE TO RELATED APPLICATION

The present application is a continuation-in-part of co-pending application Ser. No. 288,034, U.S. Pat. No. 4,896,448, issued Jan. 30, 1990.

BACKGROUND OF THE INVENTION

1. Field Of The Invention

The present invention relates to bird decoys. More particularly, the invention relates to animated bird decoys.

2. Description Of The Prior Art

Bird decoys, in the form of geese, ducks, turkeys or other game birds, have long been used by hunters to attract game birds. Bird decoys are known to be of several types. Some float on the water, others are hollow and are adapted to lie in low brush, while still others have feet to give the appearance of standing on low brush or other solid land terrain. Various sizes are also available, larger bird decoys being used to attract high flying birds to the ground.

It is also known to enhance the ability of a bird decoy to attract birds by incorporating a flagging action from movable wings mounted on the decoy, such as shown in my co-pending application, now U.S. Pat. No. 4,896,448. The present invention employs a similar mechanism to my co-pending application to pivot the body of a bird decoy, giving a more life-like appearance to the bird decoy.

SUMMARY OF INVENTION

It is the principal object of the present invention to provide an animated bird decoy that is easily mounted to an existing bird decoy.

In accordance with the object of the invention, a bird decoy of conventional construction is modified by incorporating a pivoting mechanism into a hollow body of the bird decoy. The body is attached to the pivoting mechanism through a hole formed in the body. A battery is connected to a motor of the pivoting mechanism to move the body.

The pivoting mechanism is mounted in a housing and includes a rotary drive wheel which is rotated by the motor and connected to a drive link. The drive link is slideably connected in a slot of the housing and a second slot in a first arm of a U-shaped support. The first arm and second arm of the support are pivotally connected to opposite sides of the housing, defining a pivot axis for the bird decoy. The drive wheel pivots the entire body about the pivot axis, moving the decoy up and down in a vertical plane imitating the feeding action of a live game bird, particularly turkeys.

The U-shaped support is pivotally connected for movement in a second horizontal plane to a ground stake. The entire bird decoy is able to be manually moved in the horizontal plane to present the highest profile to a game bird. The ground stake mounts the dry cell battery, providing power to the motor to actuate the pivoting mechanism.

Other aspects, features and details of the present invention can be more completely understood by reference to the following detailed description of a preferred embodiment, taken in conjunction with the drawings, and from the appended claims.

BRIEF DESCRIPTION OF THE DRAWINGS

FIG. 1 is a perspective view of a bird decoy of the present invention.

FIG. 2 is a side elevational view of the bird decoy shown in FIG. 1, the bird decoy shown in a first upright position.

FIG. 3 is a schematic side elevational view showing the bird decoy in a second downward or feeding position.

FIG. 4 is a schematic view similar to FIG. 3 showing the bird decoy pivoting in a vertical plane about a pivot axis to an upright position.

FIG. 5 is a side elevational view of a pivoting mechanism and support assembly, a body of the bird decoy being shown in partial section.

FIG. 6 is a rear elevational view of FIG. 5.

FIG. 7 is a view taken in the plane of line 7—7 of FIG. 5.

FIG. 8 is an exploded perspective view of the pivoting mechanism and the support assembly for the invention shown in FIG. 1.

FIG. 9 is a sectional view taken in the plane of line 9—9 of FIG. 8.

FIG. 10 is a sectional view taken in the plane of line 10—10 of FIG. 9.

FIG. 11 is a fragmentary side elevational view of the pivoting mechanism in the feeding position shown in FIG. 3, the pivoting mechanism shown in dotted line corresponding substantially to the upright position shown in FIG. 4.

DESCRIPTION OF THE PREFERRED EMBODIMENT

A bird decoy 10 is shown in FIGS. 1, 2, 3 and 4 to include a body 12 having a head 14 and a tail 16. The bird decoy 10 is shown in FIG. 1 in an upright or standing position with a support assembly 17 (FIGS. 5, 6 and 8). The support assembly 17 is inserted into the earth, positioning the body 12 in an elevated position. In FIGS. 3 and 4 the bird decoy 10 is shown moving under the influence of a pivoting mechanism 28 between the upright (FIG. 4) and downward or feeding (FIG. 3) positions. The present bird decoy 10 is more useful in imitating turkeys as opposed to other game birds.

The body 12 includes a hollow interior 18 (FIG. 5) in which interior 18 the pivoting mechanism 28 is mounted to the body 12. The pivoting mechanism 28 is inserted through a bottom hole 26 formed in the body 12. A motor 20 is connected by conductors 60 to a battery 30, which can be either six volts or twelve volts. Energizing the motor 20 with switch 25 (FIG. 2) causes the pivoting mechanism 28 to impart a cyclical pivoting motion to the body 12, causing the body 12 to oscillate between the upright position (FIG. 4) and the feeding position (FIG. 3). Four to six cycles per minute are generated with a six-volt battery, and a twelve-volt battery generates twice that amount. The pivotal movement is about pivot axis 53 (FIGS. 2-4) and in a vertical plane.

The pivoting mechanism 28 (FIGS. 5 through 11) includes a drive wheel 32 interconnected to the motor 20 by a gear box 31. A motor connection 34 (FIG. 9) secures the drive wheel 32 to the gear box 31. The motor 20 delivers rotary motion through the gear box 31 to the drive wheel 32. At an outer periphery of the drive wheel 32, a drive link connection 36 pivotally connects the drive wheel 32 to one end of a drive link 38. The other end of the drive link 38 is slideably connected by slide connection 48 (FIG. 7) to a tubular gear housing 40 of rectangular cross section and to a first arm 50 of a U-shaped support 19 of the support assembly 17. The slide connection 48 moves along drive link slot 42 in the housing 40 and an arm slot 49 in the first arm 50 (FIGS. 5, 10 and 11).

The housing 40 is pivotallY connected to the first arm 50 and a second arm 52 of the U-shaped support 19 at pivot connections 51 located either side of the housing 40. (FIG. 7). The pivot connections 51 define the pivot axis 53. (FIG. 5). As the other end of the drive link 38 reciprocates along the slots 42 and 49, the housing 40 and connected body 12 pivot approximately 90° between the upright position (FIG. 4) and the down or feeding position (FIG. 3). The arm slot 49 allows the slide connection 48 to reciprocate vertically up and down in line with the first arm 50 of the U-shaped support 19. Simultaneously, the slide connection 48 reciprocates along the slot 42 in the housing 40, the end result a conversion of the rotary motion from the drive wheel 32 into a pivotal motion of the entire body 12 about the pivot axis 53.

The motor 20 is connected to the housing 40. Upper and lower Z-brackets 44 and 46 attached to the housing 40 connect to upper and lower portions of the body 12 respectively through screws 59. The arms 50 and 52 extend through the hole 26 formed in the body 12 to attach to the housing 40 at the pivot connections 51.

A ground stake 21 of the support assembly 17 includes upright legs 54 and 56 formed of L-shaped angle. Angular tips 58 of the legs 54 and 56 allow the ground stake to be inserted, by manual pushing, or hammering, into the ground. A battery bracket 60 (FIGS. 5, 6 and 8) interconnects the legs 54 and 56 and provides a mounting position for the battery 30. A top support plate 62 interconnects upper ends of the legs 54 and 56 and is positioned flush against a like support plate 64 of the U-shaped support 19. Registered holes 66 and 68 are formed through plates 62 and 64 respectively and aligned by a bolt connection 70. (FIG. 6). The single bolt connection 70 between the U-shaped support 19 and the ground stake 21 permit the bird decoy 10 to be pivoted about the vertical axis defined by the bolt connection 70 in a horizontal plane, presenting a high profile to any prospective game bird. In addition, the U-shaped support 19 can be relatively quickly removed from the ground stake 21 and, as needed, the ground stake 21 may be hammered into earth surfaces that are more difficult to penetrate with the tips 58 of the legs 54 and 56.

In operation, the drive wheel 32 is rotated by the motor 20 reciprocating the slide connection 48 with respect to the slots 42 of the housing 40, transforming rotary motion into reciprocal motion at the slide connection 48. The slide connection 48 concurrently moves along the slot 49 in the arm 50, pivoting the entire housing 40 and the attached body 12 about the pivot connections 51. The reciprocal motion imparted by the rotating drive wheel 32 is transformed into pivotal or oscillatory motion about the pivot axis 53, moving the bird decoy 12 from the upright position to the feeding position in a cyclical manner. The overall impression is one of a game bird, shown as a turkey, feeding on the ground.

A method of incorporating the pivoting mechanism 28 into the body 12 allows the animated bird decoy 10 to be created from existing bird decoys such as the CARRY LITE full-body turkey decoy. In order to form the hole 26, a measurement of 17½ inches from the beak of the bird decoy towards the tail is marked. This will be in front of leg mounting holes in the CARRY LITE bird decoy. From the mark made in the prior step, a rectangle 4" wide by 6½" long is cut along the center of the decoy 10, defining the hole 26. The pivoting mechanism 28 is inserted into the hole 26, cut as just described, with the motor 20 facing the head 14 of the decoy 10. The screws 59 are used to pass through the body 12 and connect to the lower Z-bracket 46.

A small hole is punched through the body 12 from the inside and through a hole in the upper Z-bracket 44. One of the screws 59 is inserted securing the upper Z-bracket 44 to the body 12. The second hole for the upper Z-bracket is measured 1½" toward the head 14 from the first hole and the screw secured.

The bolt connection 70 is used to secure the U-shaped support 19 to the ground stake 21. The conductors 60 are interconnected between the remote switch 25 and the motor 20. (FIG. 2).

Although the present invention has been described with a certain degree of particularity, it is understood that the present disclosure has been made by way of example, and changes in detail or structure may be made without departing from the spirit of the invention, as defined in the appended claims.

I claim:

1. A bird decoy comprising in combination:
   a body having a hollow interior;
   pivoting means for transferring rotary motion into pivotal motion mounted to the interior of said body;
   motor means for imparting rotary motion to said pivoting means connected to said body; and
   a support assembly operatively connected to said pivoting means and pivotally connected to said body, said support assembly inserted into the earth, whereby said pivoting means pivots said body about the pivotal connection between the support assembly and the body between an upright and a feeding position.

2. The invention as defined in claim 1 wherein said pivoting means further includes a drive wheel connected to said motor means, which drive wheel is pivotally connected to one end of a drive link, said motor means mounted to a housing for said pivoting means, another end of said drive link concurrently slideably connected within a slot in said housing and a second slot in one of two arms of said support assembly.

3. The invention as defined in claim 1 wherein said support assembly further includes an upper U-shaped support operatively connected to said pivoting means and pivotally connected to said body and a lower ground stake inserted into the earth and pivotally connected to said upper U-shaped support, whereby the bird decoy cycles through pivotal movement in a vertical plane and said U-shaped support is pivotal with respect to said ground stake in a second horizontal plane.

4. A bird decoy comprising in combination:
   a body having a hollow interior;
   pivoting means for transferring rotary motion into reciprocal motion and reciprocal motion into cyclical pivotal motion mounted to the interior of said body;
   motor means for imparting rotary motion to said pivoting means connected to said body;

a slide connection between said motor means and said body and between said body and a U-shaped support, said upper U-shaped support pivotally connected to said body, whereby said pivoting means pivots said body about the pivotal connection between the U-shaped support and the body in a vertical plane.

5. The invention as defined in claim 4 wherein a ground stake is pivotally connected to said U-shaped support, said ground stake inserted into the earth, said pivotal connection between said U-shaped support and said ground stake providing pivotal movement to said bird decoy in a horizontal plane.

6. A bird decoy including a body having a hollow interior, comprising in combination:

a pivoting mechanism, including a motor providing rotary motion and transform means for transforming said rotary motion into reciprocal movement and reciprocal movement into cyclical pivotal motion, said pivoting mechanism mounted to said body and projecting through said body to connect to a support assembly, said pivoting mechanism defining means for pivoting said body about a pivot axis through said support assembly in a predefined oscillatory motion.

* * * * *